US012776652B1

(12) United States Patent
Howard

(10) Patent No.: US 12,776,652 B1
(45) Date of Patent: Oct. 27, 2026

(54) SYSTEM AND METHOD FOR PROVIDING CONTROL FOR INVERTER-BASED RESOURCE

(71) Applicant: GE Vernova Infrastructure Technology LLC, Greenville, SC (US)

(72) Inventor: Dustin F. Howard, Brookhaven, GA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/222,100

(22) Filed: May 29, 2025

(51) Int. Cl.
*H02J 3/38* (2026.01)
*H02J 101/28* (2026.01)
*H02P 9/00* (2006.01)
*H02P 21/14* (2016.01)

(52) U.S. Cl.
CPC .............. *H02J 3/381* (2013.01); *H02P 9/007* (2013.01); *H02P 21/141* (2013.01); *H02J 2101/28* (2026.01)

(58) Field of Classification Search
None
See application file for complete search history.

(56) References Cited

U.S. PATENT DOCUMENTS 5,798,633 A 8/1998 Larsen et al.
9,270,194 B2 2/2016 Brogan et al.
11,411,520 B1 8/2022 Howard et al.
2010/0142237 A1 6/2010 Yuan et al.
2012/0112708 A1* 5/2012 Park ........................ H02P 21/50 322/25
2013/0009610 A1* 1/2013 Niiranen ................ B26D 7/015 322/19
2022/0271695 A1* 8/2022 Howard .................. H02P 9/007
2023/0041049 A1* 2/2023 Larsen .................... F03D 9/255

FOREIGN PATENT DOCUMENTS

WO WO2021/145877 A1 7/2021

* cited by examiner

*Primary Examiner* — John W Poos
*Assistant Examiner* — Aqeel H Bukhari
(74) *Attorney, Agent, or Firm* — Dority & Manning, P.A.

(57) ABSTRACT

A method for operating a generator of an inverter-based resource (IBR), the generator having a rotor and a stator, includes determining, via a controller, a predicted value for a non-linear magnetizing parameter of the generator based at least partially on a stator flux signal. The method also includes determining, via the controller, a corrected value for the non-linear magnetizing parameter based at least partially on a stator voltage feedback signal. Further, the method includes determining, via the controller, an expected value for the non-linear magnetizing parameter based on the predicted value for the non-linear magnetizing parameter and the corrected value for the non-linear magnetizing parameter. Moreover, the method includes determining, via the controller, a rotor current command signal based at least partially on the expected value for the non-linear magnetizing parameter. In addition, the method includes controlling, via the controller, the generator based on the rotor current command signal.

20 Claims, 13 Drawing Sheets

SYSTEM AND METHOD FOR PROVIDING CONTROL FOR INVERTER-BASED RESOURCE

FIELD

The present disclosure relates generally to an inverter-based resource (IBR), such as a wind turbine, and, more particularly, to systems and methods for providing grid-forming control of a generator of the IBR.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as doubly-fed induction generators (DFIG), operate in a "grid-following" mode. Grid-following type devices utilize fast current-regulation loops to control active and reactive power exchanged with the grid. More specifically, FIG. 1 illustrates the basic elements of the main circuit and converter control structure for a grid-following (GFL) DFIG. As shown, the active power reference to the converter is developed by the energy source regulator, e.g., the turbine control portion of a wind turbine. This is conveyed as a torque reference, which represents the lesser of the maximum attainable power from the energy source at that instant, or a curtailment command from a higher-level grid controller. The converter control then determines a current reference for the active component of current to achieve the desired torque. Accordingly, the DFIG includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming (GFM) IBRs act as a voltage source behind an impedance and provide a voltage-source characteristic, where the angle and magnitude of the voltage are controlled to achieve the regulation functions needed by the grid. In particular, with this structure, current will flow according to the demands of the grid, while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a DFIG are disclosed in PCT/US2020/013787 entitled "System and Method for Providing Grid-Forming Control for a Doubly-Fed Wind Turbine Generator."

In particular, as shown in FIG. 2, the grid-forming voltage-source is realized on the stator voltage for implementing grid forming control for a DFIG using the stator voltage regulator. More specifically, as shown, the stator voltage regulator 50 is configured to receive a higher level command (e.g., $E_I$) for magnitude of the stator voltage and a higher level command (e.g., Sr) for angle of the stator voltage with respect to the phase-locked loop angle. Further, as shown, the stator voltage regulator 50 can then convert the voltage command(s) to a stator voltage command (e.g., VS_Cmd_xy) as shown at 52. The stator voltage regulator 50 may then determine a magnetizing current feed forward signal (e.g., IM_FF_xy) as a function of the stator voltage command and a magnetizing admittance (e.g., jBmag 54), which may correspond to a magnetizing susceptance. As such, the magnetizing current feed forward signal is configured to facilitate a rapid response of stator voltage to the stator voltage command.

In addition, as shown, the stator voltage regulator 50 may also receive a stator voltage feedback signal (e.g., VS_Fbk_xy) and, as shown at 62, determine a difference between the stator voltage feedback signal and the stator voltage command. Thus, in an embodiment, as shown, the stator voltage regulator 50 may also determine a magnetizing current correction signal (e.g., IM_Corr_xy) via a proportional-integral regulator 64. Accordingly, as shown at 56, the stator voltage regulator 50 can then add the magnetizing current feed forward signal (e.g., IM_FF_xy) to the magnetizing current correction signal (IM_Corr_xy) from the power regulator to determine the magnetizing current command (e.g., IM_Cmd_xy).

Furthermore, as shown at 58, the stator voltage regulator 50 may determine the rotor current command(s) (e.g., IR_Cmd_xy) as a function of the magnetizing current command (e.g., IM_Cmd_xy) and a stator current feedback signal (e.g., IS_Fbk_xy). Thus, in an embodiment, the measured stator current signal may be fed into the rotor current command, as shown at 58, so as to substantially decouple a stator responsive stator voltage from one or more grid characteristics. More specifically, in particular embodiments, as shown, the stator voltage regulator 50 may determine the rotor current command(s) by adding the magnetizing current command to the measured stator current feedback signal. In addition, as shown, a limiter 60 may place limits to the rotor current command as appropriate to respect equipment rating(s).

In such systems, non-linear magnetizing characteristics of the generator can be determined by electrical tests. Modern DFIGs have a wide range of ratings and generator types used for applications. Additionally, identical generator designs practically exhibit different magnetizing characteristics due to nonuniformity in construction or materials. For these reasons, it is not practical to perform tests separately for each generator, nor is it practical to use the same characteristics for all generators.

Accordingly, systems and methods for determining the magnetizing reactance automatically using the existing converter hardware and feedbacks would be beneficial for use in grid-forming converter control systems in IBRs.

BRIEF DESCRIPTION

Aspects and advantages of the invention will be set forth in part in the following description, or may be obvious from the description, or may be learned through practice of the invention.

In an aspect, the present disclosure is directed to a method for operating a generator of an inverter-based resource (IBR). The generator has a rotor and a stator. The method includes determining, via a controller, a predicted value for a non-linear magnetizing parameter of the generator based at least partially on a stator flux signal. The method also includes determining, via the controller, a corrected value for the non-linear magnetizing parameter based at least partially on a stator voltage feedback signal. Further, the method includes determining, via the controller, an expected value for the non-linear magnetizing parameter based on the predicted value for the non-linear magnetizing parameter and the corrected value for the non-linear magnetizing parameter. Moreover, the method includes determining, via the controller, a rotor current command signal based at least partially on the expected value for the non-linear magnetizing parameter. In addition, the method includes controlling, via the controller, the generator based on the rotor current command signal.

In another aspect, the present disclosure is directed to a wind turbine. The wind turbine includes a generator having a rotor and a stator. The wind turbine also includes a controller comprising at least one processor. The at least one processor is configured to perform a plurality of operations. The plurality of operations includes determining a predicted value for a non-linear magnetizing parameter of the generator based at least partially on a stator flux signal. The plurality of operations also includes determining a corrected value for the non-linear magnetizing parameter based at least partially on a stator voltage feedback signal. Further, the plurality of operations includes determining an expected value for the non-linear magnetizing parameter based on the predicted value for the non-linear magnetizing parameter and the corrected value for the non-linear magnetizing parameter. Moreover, the plurality of operations includes determining a rotor current command signal based at least partially on the expected value for the non-linear magnetizing parameter. In addition, the plurality of operations includes controlling the generator based on the rotor current command signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
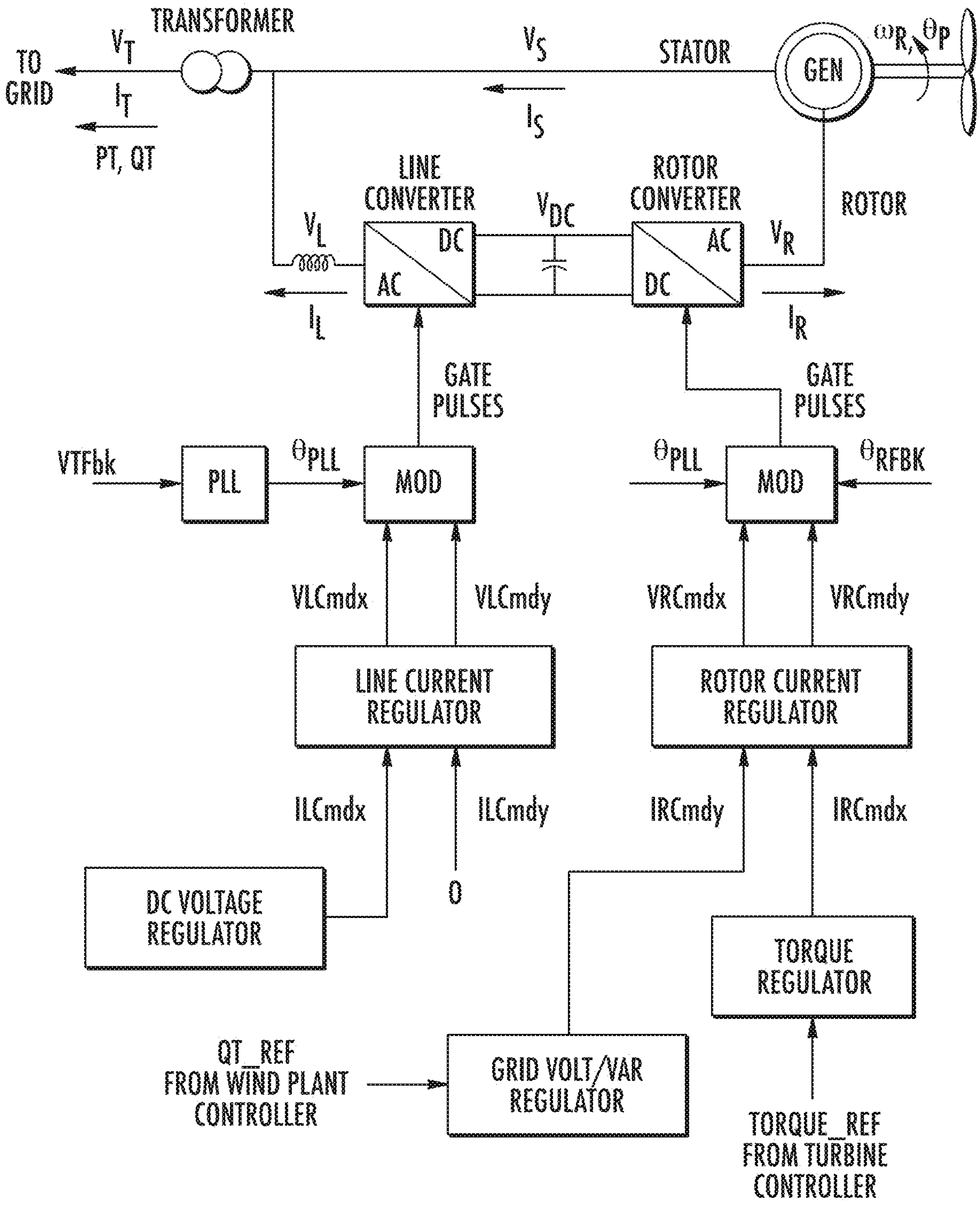
FIG. 1 (PRIOR ART)
FIG. 1 illustrates a one-line diagram of a doubly-fed induction generator with structure of converter controls for grid-following application according to conventional construction.
Figure 2:
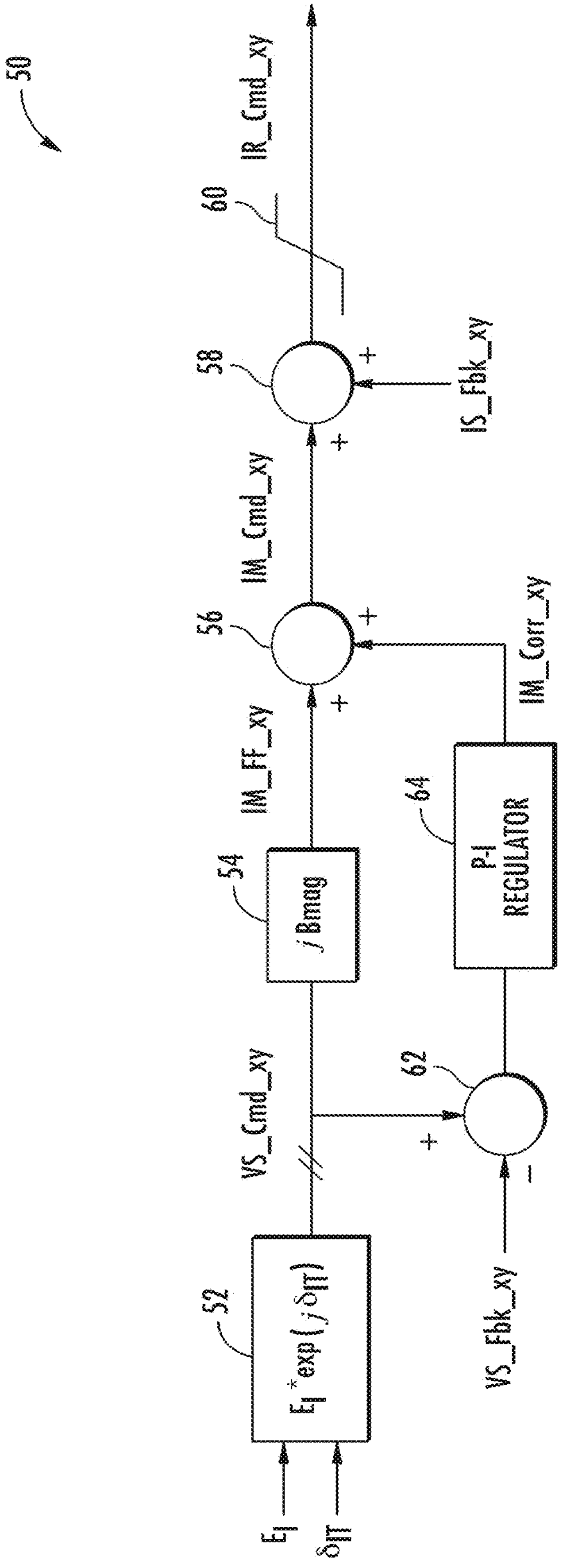
FIG. 2 (PRIOR ART)
FIG. 2 illustrates a schematic diagram of an embodiment of a grid forming stator voltage regulator of a doubly-fed induction generator according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of an embodiment can be used with another embodiment to yield a still further embodiment. Thus, it is intended that the present invention covers such modifications and variations as come within the scope of the appended claims and their equivalents.

In general, the present disclosure is directed to systems and method for providing grid-forming control for a doubly-fed induction generator (DFIG) of an inverter-based resource (IBR). More particularly, in certain embodiments, grid-forming control in DFIGs can be achieved by controlling current through the magnetizing branch in the generator, thereby producing a voltage drop across the magnetizing impedance. A fixed control setting representing the magnetizing reactance can be used in the control, but this will result in errors in the voltage that is realized by the controller. The errors will change based on operating conditions due to the non-linear characteristics of the real magnetizing impedance. Accordingly, the desired voltage of the grid-forming system can be more accurately controlled if the non-linear magnetizing characteristic(s), such as the non-linear magnetizing reactance, is included as part of the control scheme. For example, in an embodiment, the non-linear magnetizing characteristic(s) (e.g., a magnetizing reactance) can be estimated based on a stator flux signal, such as a stator flux command signal or a stator flux feedback signal, and can be corrected based on a difference between a stator voltage feedback signal and a stator voltage command signal. Correcting the estimated non-linear magnetizing characteristic (s) directly accounts for actual errors injected by a magnetizing impedance of the generator. As such, the corrected non-linear magnetizing characteristic(s) can then be used for more accurately controlling the voltage in the grid-forming system as described herein.

Figure 3:
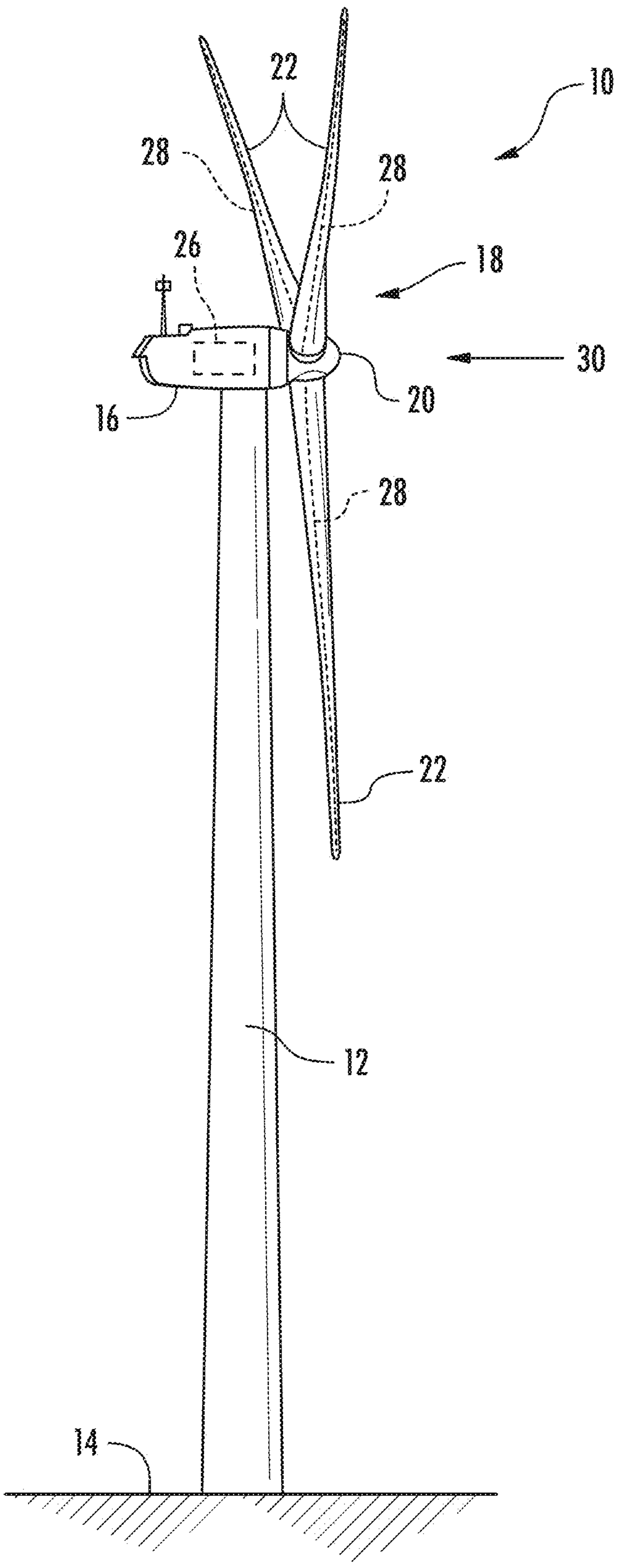
FIG. 3 illustrates a perspective view of an embodiment of a wind turbine according to the present disclosure.

Referring now to the drawings, FIG. 3 illustrates a perspective view of an embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 4) positioned within the nacelle 16 to permit electrical energy to be produced.

The wind turbine 10 may also include a turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 4:
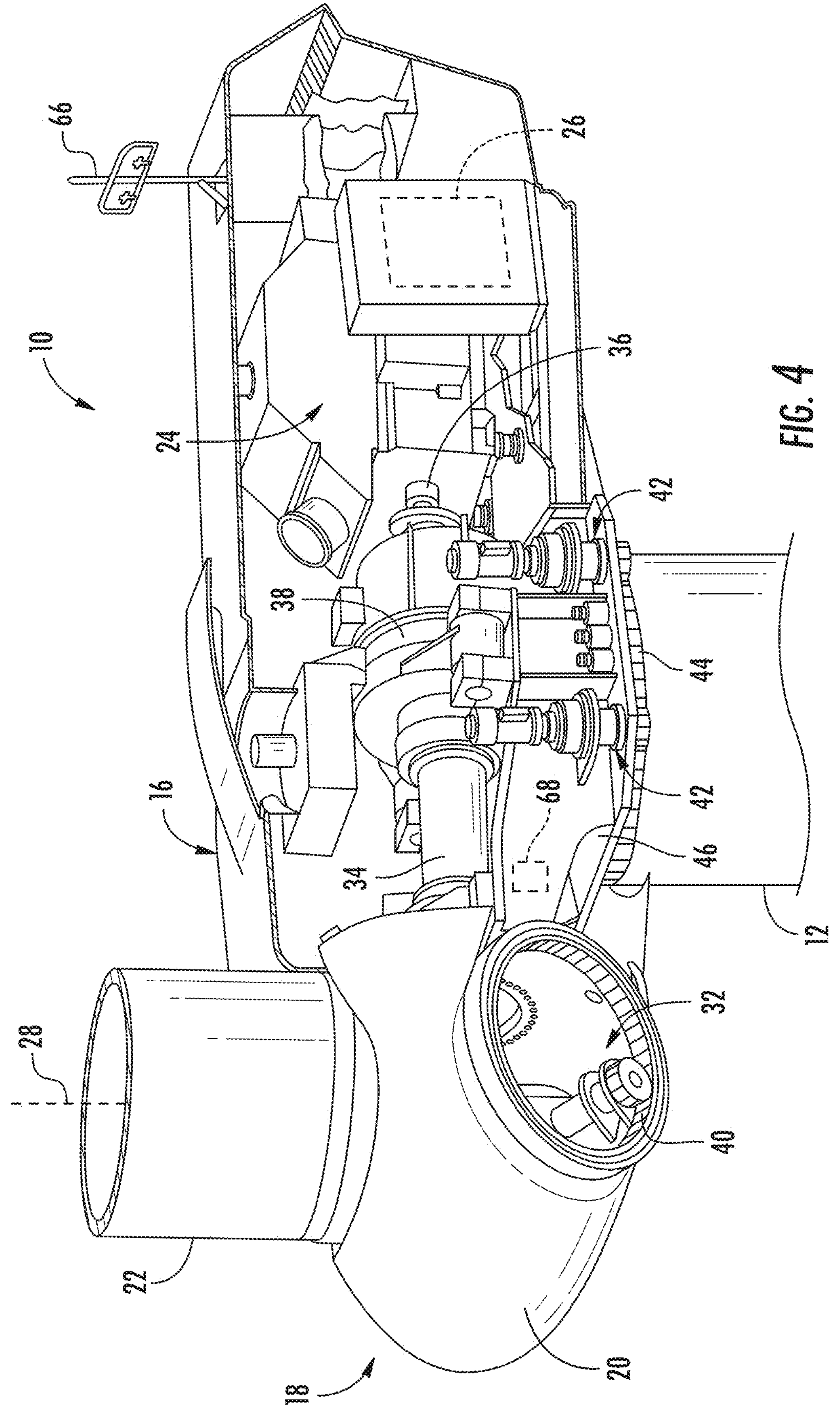
FIG. 4 illustrates a simplified, internal view of an embodiment of a nacelle according to the present disclosure.

Referring now to FIG. 4, a simplified, internal view of an embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the turbine controller 26, with each pitch drive mechanisms(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 30, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 5:
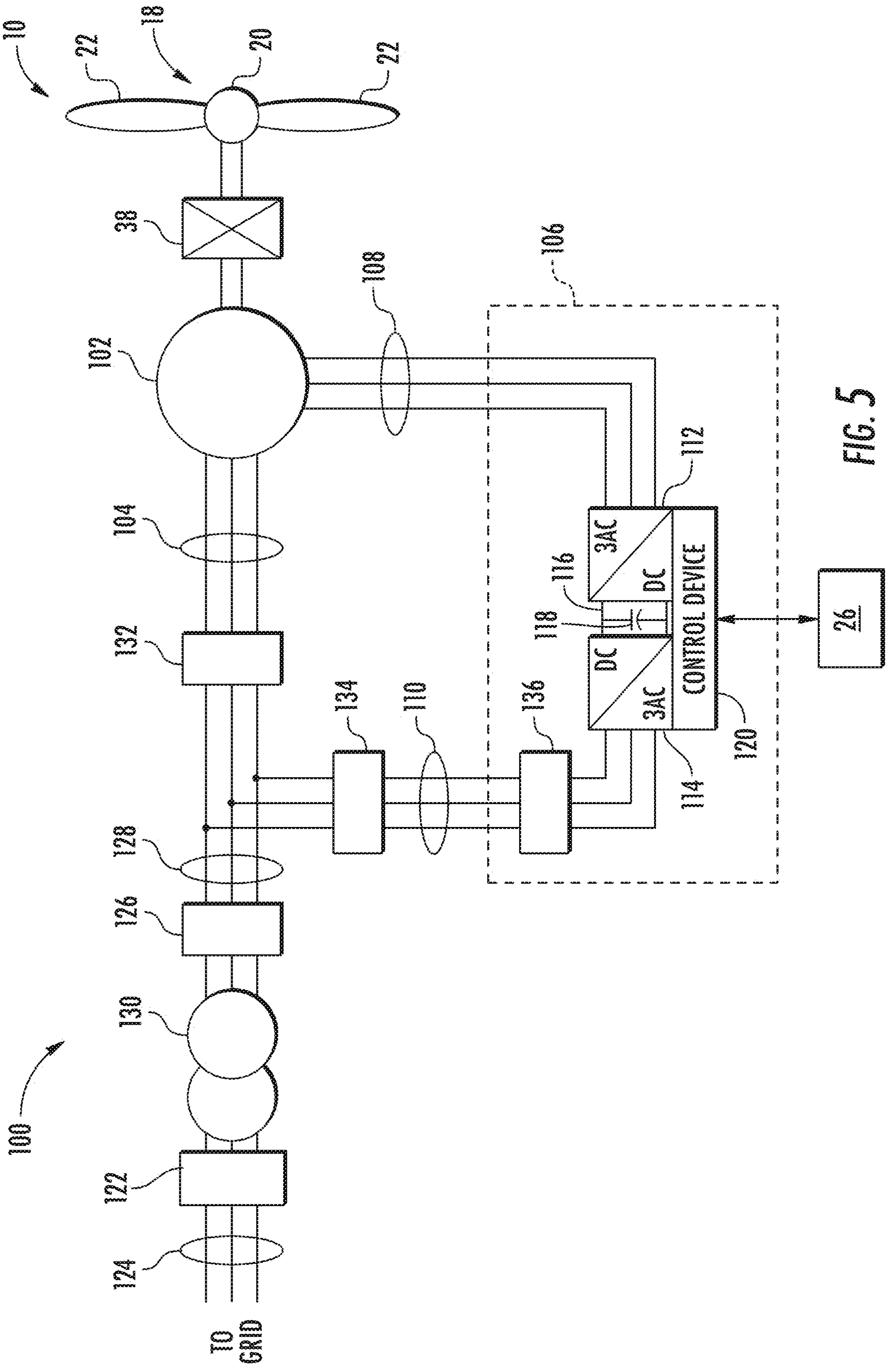
FIG. 5 illustrates a schematic view of an embodiment of a wind turbine electrical power system suitable for use with the wind turbine shown in FIG. 3.
Figure 6:
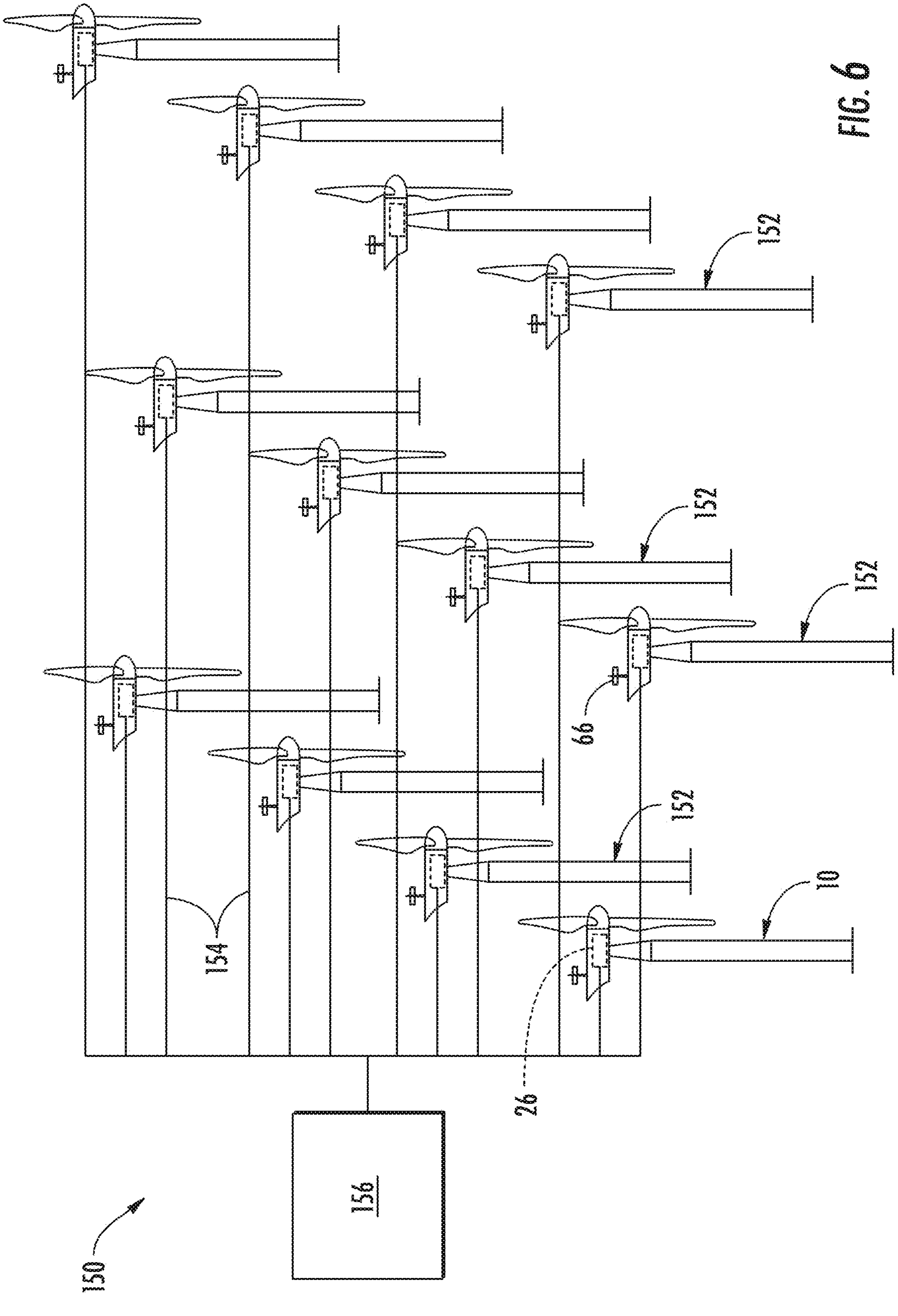
FIG. 6 illustrates a schematic view of an embodiment of a wind farm having a plurality of wind turbines according to the present disclosure.

Referring now to FIGS. 5 and 6, schematic diagrams of certain embodiments of a wind turbine power system 100 is illustrated in accordance with aspects of the present disclosure. In particular, FIG. 5 illustrates a schematic view of an embodiment of the wind turbine electrical power system 100 suitable for use with the wind turbine 10 shown in FIG. 3, whereas FIG. 6 illustrates a simplified equivalent circuit of the wind turbine electrical power system 100. Although the present disclosure will generally be described herein with reference to the wind turbine electrical power system 100 shown in FIGS. 5 and 6, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 5 and as mentioned, the rotor 18 of the wind turbine 10 (FIG. 3) may, optionally, be coupled to the gearbox 38, which is, in turn, coupled to a generator 102, which may be a DFIG as described herein. As shown in FIGS. 5 and 6, the DFIG 102 may be connected to a stator bus 104. Further, as shown in FIGS. 5 and 6, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the RSC 112. Additionally, the RSC 112 is coupled to the LSC 114 via a DC link 116 across which is a DC link capacitor 118. The LSC 114 is, in turn, coupled to the line side bus 110. The power converter 106 may also include a dynamic brake 105 as shown in FIG. 6.

The RSC 112 and the LSC 114 may be configured for normal operating mode in a three-phase, pulse width modulation (PWM) arrangement using one or more switching devices, such as insulated gate bipolar transistor (IGBT) switching elements. In addition, as shown in FIG. 5, the power converter 106 may be coupled to a converter controller 120 in order to control the operation of the RSC 112 and/or the LSC 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor-bus side, sinusoidal multi-phase (e.g., three-phase) alternating current (AC) power is provided to the power converter 106. The RSC 112 converts the AC power provided from the rotor bus 108 into direct current (DC) power and provides the DC power to the DC link 116. As is generally understood, switching elements (e.g., IGBTs) used in the bridge circuits of the RSC 112 may be modulated to convert the AC power provided from the rotor bus 108 into DC power suitable for the DC link 116.

In addition, the LSC 114 converts the DC power on the DC link 116 into AC output power suitable for the electrical grid 124. In particular, switching elements (e.g., IGBTs) used in bridge circuits of the LSC 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, as shown in FIG. 5, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The DC link capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 6, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In an embodiment, the turbine controllers of the plurality of wind turbines 152 are communicatively coupled to the farm-level controller 156, e.g., through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 7:
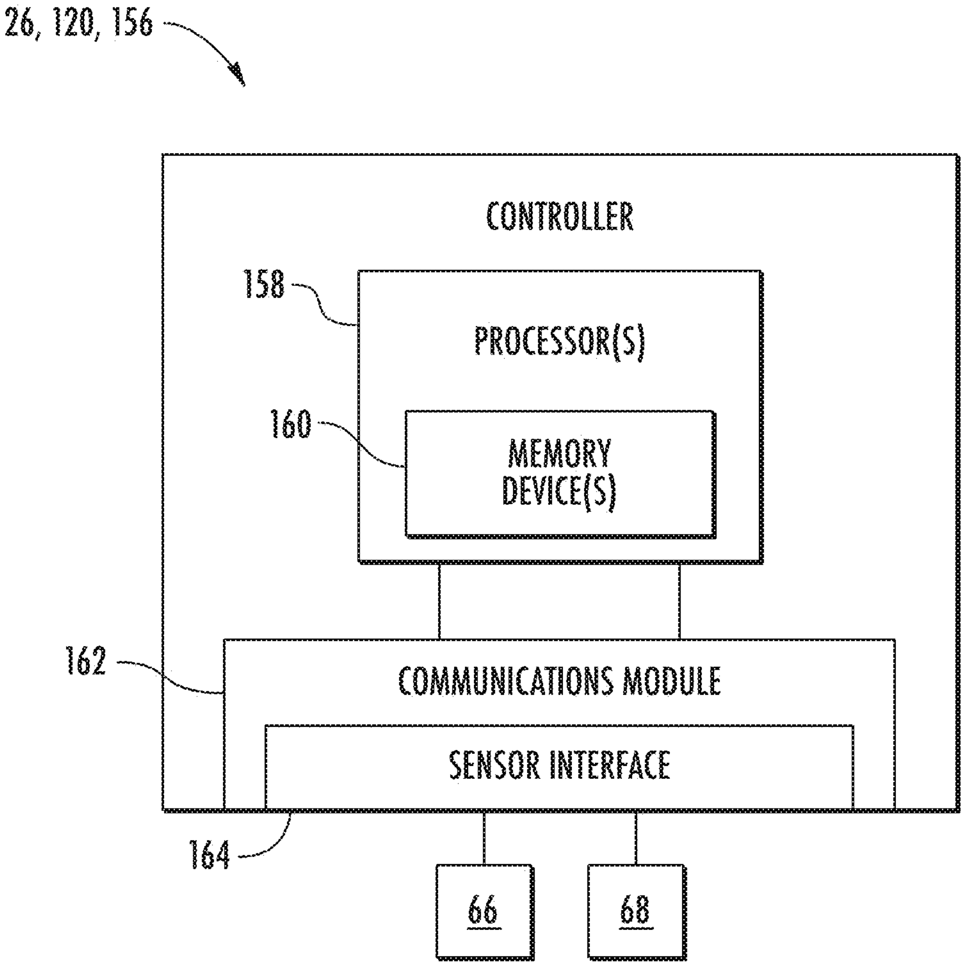
FIG. 7 illustrates a block diagram of an embodiment of a controller according to the present disclosure.

Referring now to FIG. 7, a block diagram of an embodiment of suitable components that may be included within the controller (such as any one of the turbine controller 26, the converter controller 120, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 58.

Figure 8:
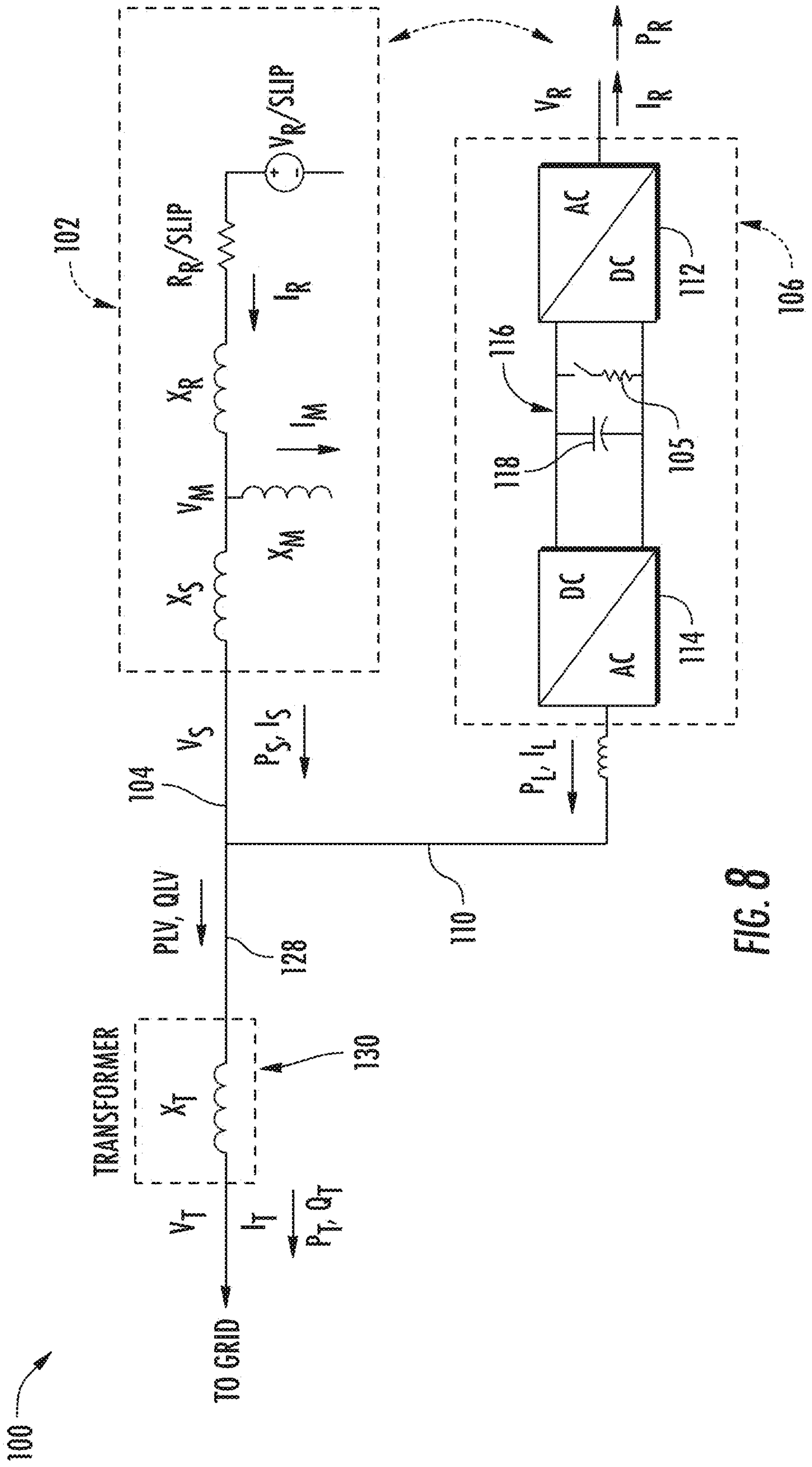
FIG. 8 illustrates a schematic diagram of an embodiment of a simplified equivalent circuit of a wind turbine electrical power system according to the present disclosure.

Referring particularly to FIG. 8, as mentioned, a one-line circuit diagram of the wind turbine power system 100 is illustrated according to the present disclosure. More particularly, as shown, the power ($P_T$) generated by the wind turbine power system 100 is the sum of the power from the generator stator ($P_S$) and the LSC 114 ($P_L$), given by Equation (1) below:

$$P_T = P_S + P_L \quad \text{Equation (1)}$$

Further, the power from the LSC 114 ($P_L$) can be approximated by assuming all the power from the rotor ($P_R$) of the DFIG 102 passes to the LSC 114, as given in Equation (2) below:

$$P_L \approx -P_R = -\text{slip} * P_S \quad \text{Equation (2)}$$

wherein the slip is defined by the relationship of Equation (3) provided below:

$$\text{slip} = (\omega_{elec} - \omega_{rot}) / \omega_{elec} \quad \text{Equation (3)}$$

wherein $\omega_{elec}$ is the electrical frequency of the wind turbine power system 100, and $\omega_{rot}$ is the rotor speed of the rotor 18 of the wind turbine power system 100.

Thus, in an embodiment, by combining the aforementioned relationships, the ratio of the stator power ($P_S$) to the total power ($P_T$) can be expressed using Equation (4) below:

$$P_S / P_t = 1 / (1 - \text{slip}) \quad \text{Equation (4)}$$

Still further relationships illustrated in FIG. 8, such as voltage (V), current (I), and reactance (X), etc., will be described in more detail herein.

Figure 11:
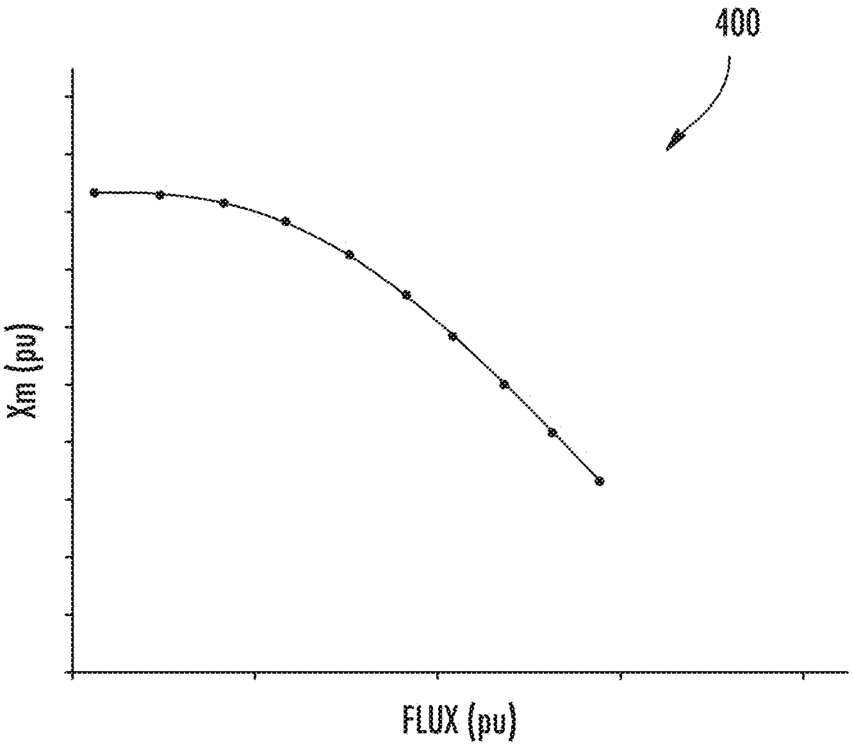
FIG. 11 illustrates a graph of an embodiment of a typical saturation curve of magnetizing reactance (y-axis) versus flux (x-axis) according to the present disclosure.

Furthermore, as shown in FIG. 8, a magnetizing reactance (Xm) of the DFIG 102 varies significantly with flux due to the non-linear permeability of the materials used in the construction of the generator iron core. Other factors that determine the magnetizing reactance (Xm) are the stator and rotor winding turns, dimensions of stator and rotor, and material used in the construction. While these factors vary among different generator ratings and designs, the non-linear characteristic of the magnetizing reactance (Xm) generally follows a characteristic curve as shown in FIG. 11.

Figure 9:
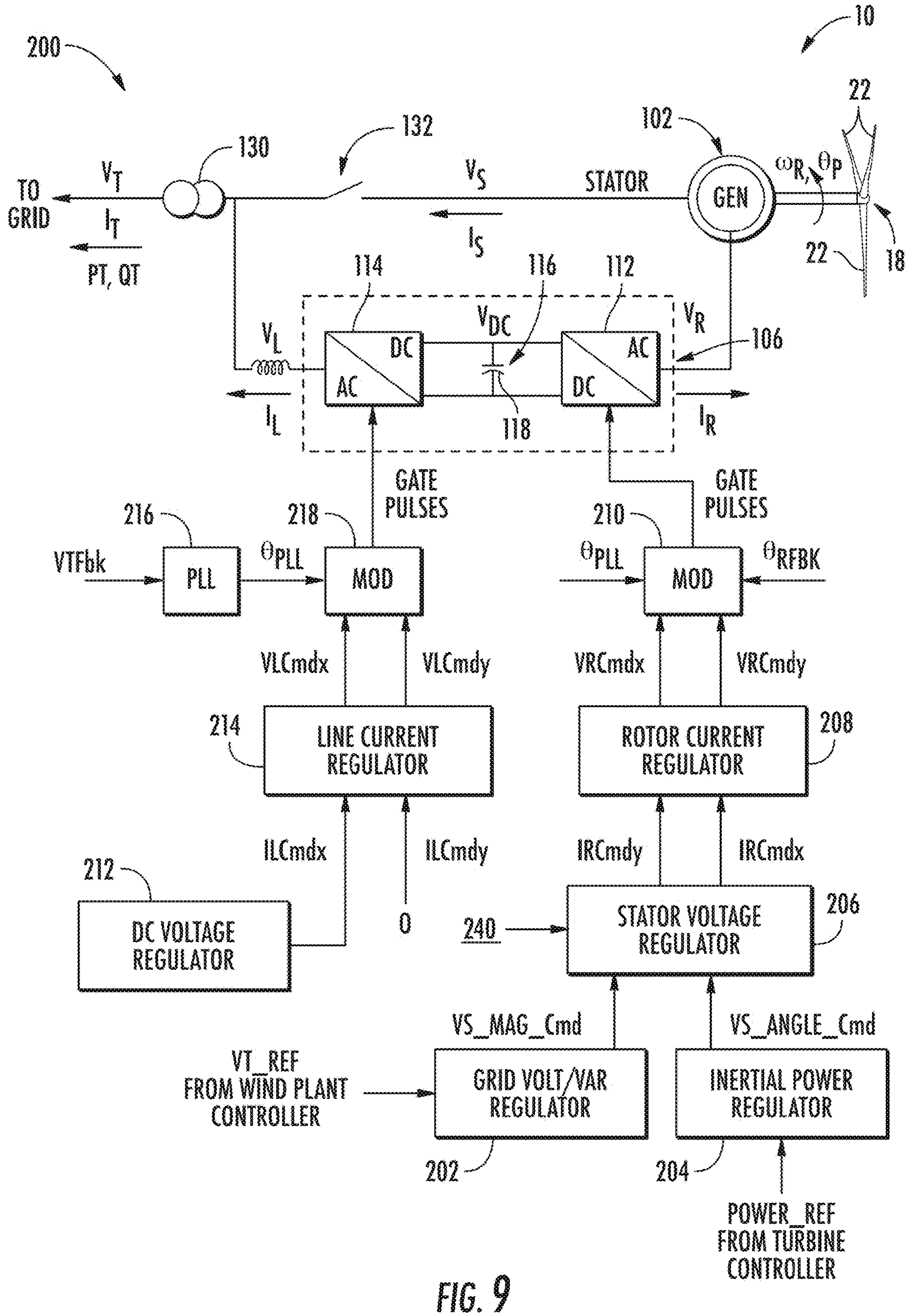
FIG. 9 illustrates a one-line diagram of an embodiment of a doubly-fed induction generator with converter controls for grid-forming application according to the present disclosure.

Referring now to FIG. 9, a schematic diagram of an embodiment of a system 200 for providing grid-forming control of a DFIG of a wind turbine according to the present disclosure is illustrated. More specifically, as shown, the system 200 may include many of the same features of FIG. 5 described herein, with components having the same reference characters representing like components. Further, as shown, the system 200 may include a control structure for controlling the line-side converter that is similar to the control structure shown in FIG. 5.

Moreover, as shown, the LSC control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g., a phase-locked loop angle) from a phase-locked loop 216 to generate one or more gate pulses for the LSC 114. The phase-locked loop 216 typically generates its output using a voltage feedback signal.

Furthermore, as shown, the system 200 may also include a control structure for controlling the RSC 112 using grid-forming characteristics. In particular, as shown in FIG. 9, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210. Further, as shown in FIG. 9, the output from the stator voltage regulator 206 is command signals for rotor current, which is implemented in the rotor current regulator 208 by generating rotor voltage command signals (VRCmdx and VRCmdy) for the modulator 210.

In an embodiment, the grid voltage/VAR regulator 202 receives a voltage reference signal (e.g., VT_REF) from the farm-level controller 156 and generates a stator voltage magnitude command signal (e.g., VS_Mag_Cmd), whereas the inertial power regulator receives a power reference signal from the turbine controller 26 and generates a stator voltage angle command signal (e.g., VS_Angle_Cmd). More specifically, in an embodiment, as shown, the stator voltage regulator 206 determines the rotor current command signals (e.g., IRCmdy and IRCmdx) as a function of the stator voltage magnitude command signal, the stator voltage angle command signal, and/or a stator current feedback signal 240 of the DFIG 102. It should be understood that the stator feedback current 240 is a strong indicator of the characteristics of the externally connected power system, i.e., the grid. Therefore, the stator feedback current 240 can be used as a feedback signal to decouple the response of stator voltage to variations to the nature of the grid. Further details relating to the stator voltage regulator 206 are further explained and described in PCT/US2020/013787 entitled "System and Method for Providing Grid-Forming Control for a Doubly-Fed Wind Turbine Generator," which is incorporated herein by reference in its entirety.

As mentioned, with grid-forming control, current changes rapidly when there are grid disturbances. Further, the control action is gradual to restore the steady-state operating conditions commanded by higher-level controls. The amount of current change is inversely related to the total impedance of the circuit. However, if the current exceeds limits, then the control responds rapidly to force the current to be within limits.

Although the present disclosure will generally be described herein with reference to the system 200 for providing grid-forming control of a DFIG of a wind turbine shown in FIG. 9, those of ordinary skill in the art, using the disclosures provided herein, should understand that aspects of the present disclosure may also be applicable in other control structures, and, as mentioned above, that the invention is not limited to grid-forming control. For example, the system may be configured for providing hybrid grid-forming and grid-following control a DFIG of a wind turbine.

Figure 10:
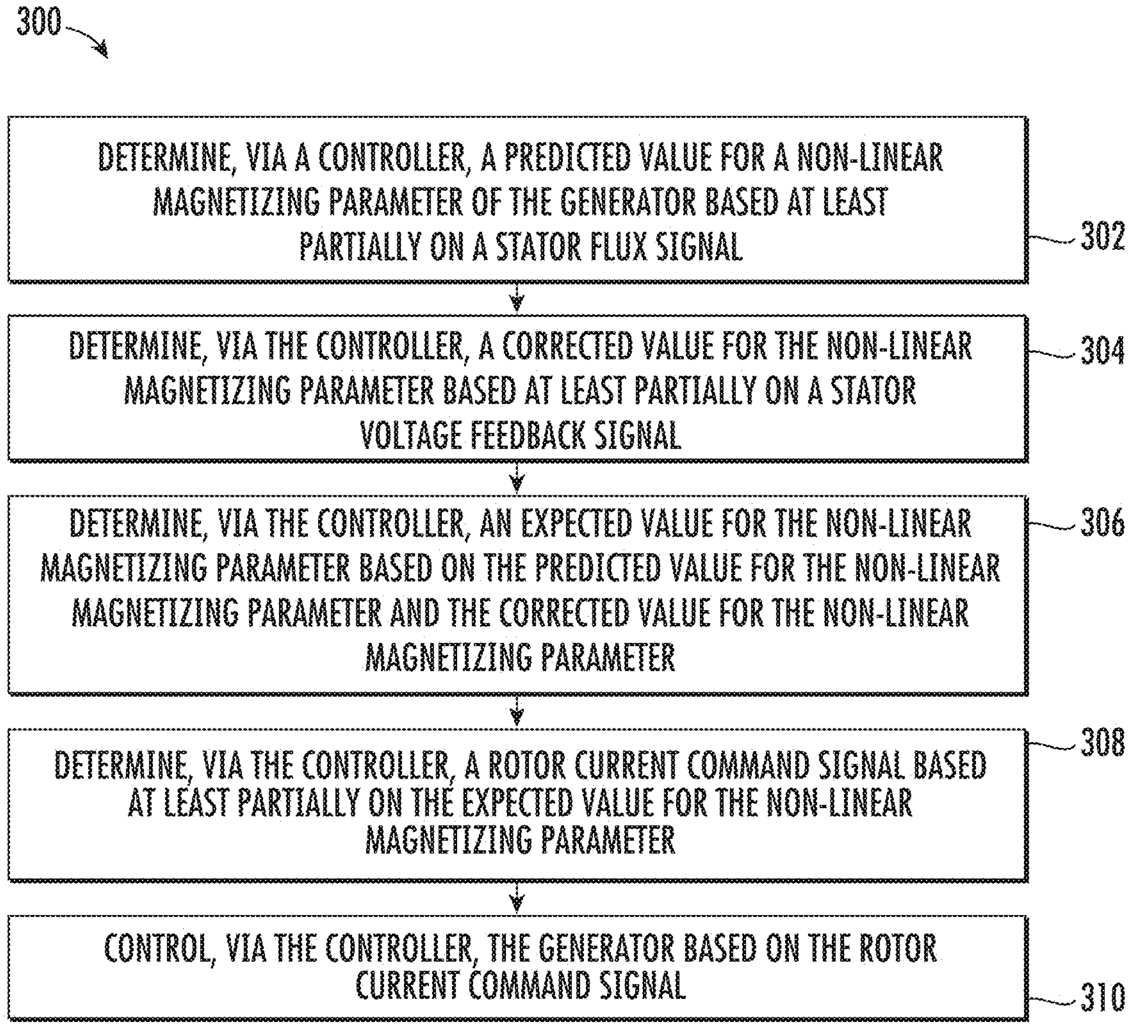
FIG. 10 illustrates a flow diagram of an embodiment of a method for controlling a wind turbine power system connected to an electrical grid according to the present disclosure.

Thus, FIG. 10 generally describes a method 300 for providing grid-forming control of a wind turbine generator, such as DFIG 102 according to the present disclosure. Referring particularly to FIG. 10, a flow diagram of an embodiment of a method 300 method for controlling a wind turbine power system connected to an electrical grid, such as wind turbine power system 100, according to the present disclosure is illustrated. It should be appreciated that the disclosed method 300 may be implemented with any suitable wind turbine generator having any suitable configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes determining, via a controller (such as any of the controllers 26, 56, 120 described herein), a predicted value for a non-linear magnetizing parameter of the double-fed generator based at least partially on a stator flux signal. In embodiments, the non-linear magnetizing parameter comprises a magnetizing reactance. In some embodiments, the stator flux signal comprises a stator flux command signal. In other embodiments, the stator flux signal comprises a stator flux feedback signal.

Further, in embodiments, the controller may be configured to determine the predicted value for the non-linear magnetizing parameter via a model. In such embodiments, the controller can provide the stator flux signal to the model, and the model can be configured to generate the predicted value for the non-linear magnetizing parameter. The model can be any suitable model (e.g., a look-up table, a mathematical model, a graphical model, etc.) for representing a relationship between the non-linear magnetizing parameter (s) and the stator flux signal for the double-fed generator. For example, in some embodiments, the model can be a saturation curve 400, similar to that shown in FIG. 11. More particularly, the saturation curve 400 may represent stator voltage levels (y-axis) (e.g., the magnetizing reactance Xm) versus flux, as shown. It should be understood that the saturation curve 400 may represent other non-linear magnetizing parameters and/or other operating parameters of the DFIG 102. In some embodiments, the saturation curve 400 may also be scaled or offset in a way to reflect the change in saturation characteristic with the active power loading on the DFIG 102.

In embodiments, the saturation curve 400 may In some embodiments, the saturation curve 400 may also be scaled or offset in a way to reflect the change in saturation characteristic with the active power loading on the DFIG 102. include a piecewise-linear curve fit. For example, in such embodiments, a piecewise-linear curve fit can be obtained by connecting two consecutive points on the curve via a linear segment approximated by a slope and y-intercept. In such embodiments, the slopes and y-intercepts calculated based on measured data can be used to model the magnetizing characteristic for the generator in the grid-forming control. Further details relating to the generation of the saturation curve 400 are further explained and described in U.S. Pat. No. 11,411,520 entitled "System and Method for Providing Grid-Forming Control for a Double-Fed Wind Turbine Generator," which is incorporated herein by reference in its entirety.

Various tests can be performed on the DFIG 102 to measure the non-linear magnetizing characteristics. In an embodiment, such tests may include a no-load test. In such embodiments, this test may include running the DFIG 102 with zero slip and exciting the DFIG 102 through the stator winding. Measurements for a range of applied stator voltage levels while measuring stator current can be used to estimate the saturation curve 400. For example, current and voltage measurements may be collected for a time period. More particularly, the collected current and voltage measurements may be averages for the time period to remove noise and calculating the non-linear magnetizing parameter(s) based on the averaged current and voltage measurements for the time period. Thus, the non-linear magnetizing parameter(s) may be calculated based on the current and voltage measurements for the time period and then fit to the saturation curve 400 (e.g., using a conventional interpolation algorithm). As an example, the magnetizing reactance can be estimated using voltage and current measurements using Equation (5) below:

$$Xm = |\text{Flux}| / |Is| \quad \text{Equation (5)}$$

where the rotor current is assumed to be zero at zero slip and the flux can be calculated from the stator voltage using Equation (6) below:

$$|\text{Flux}| = |Vs| / \omega_{elec} \quad \text{Equation (6)}$$

where $\omega_{elec}$ is the frequency of the voltage and Equations (5) and (6) reflect per-unit quantities.

In certain embodiments, the data collected from the aforementioned test may be post-processed and analyzed separately after the testing is carried out to determine the generator magnetizing characteristics. Modern wind turbines have a wide range of ratings and generator types used for applications. Therefore, the curves used to approximate the magnetizing characteristics of the generator may be different for different generator designs.

Referring back to FIG. 10, as shown at (304), the method 300 includes determining, via the controller, a corrected value for the non-linear magnetizing parameter based at least partially on a stator voltage feedback signal. Feedback signals described herein may be measured by the one or more sensors 66 and/or determined by (e.g., according to known mathematical techniques) one or more controllers 26, 56, 120 (e.g., based on measurements received from the one or more sensors 66). In embodiments, the corrected value for the non-linear magnetizing parameter can be determined based on a difference between the stator voltage feedback signal and a stator voltage command signal, as will be described further below in regards to FIG. 12.

As shown at (306), the method 300 includes determining, via the controller, an expected value for the non-linear magnetizing parameter based on the predicted value for the non-linear magnetizing parameter and the corrected value for the non-linear magnetizing parameter. For instance, the expected value for the non-linear magnetizing parameter may be determined by combining the predicted and corrected values for the non-linear magnetizing parameter, as will be described further below in regards to FIG. 12.

As shown at (308), the method 300 includes determining, via the controller, a rotor current command signal based at least partially on the expected value for the non-linear magnetizing parameter. In some embodiments, the rotor command signal can be determined based on a magnetizing current command signal, a stator current feedback signal, and/or an angle correction factor ($\ominus_{CORR}$), as will be described further below in regard to FIG. 12. Further, the magnetizing current command signal can be determined based on the expected value for the non-linear magnetizing parameter, as will be described further below in regard to FIG. 12.

In some embodiments, the angle correction factor ($\ominus_{CORR}$) is configured to correct a rotor position error with respect to a synchronous reference frame. In such embodiments, a rotor current command signal (IRCmdx and IRCmdy) may be rotated based on the angle correction factor ($\ominus_{CORR}$) (e.g., according to known signal rotation techniques, such as applying an exp(j*Th) to complex variables or a rotation matrix in vector form). Further details relating to the angle correction factor ($\ominus_{CORR}$) are further explained and described in PCT/US2024/059804 entitled "System and Method for Operating Generator of Grid-Forming Inverter-Based Resource," which is incorporated herein by reference in its entirety.

As shown at (310), the method 300 includes controlling, via the controller, the double-fed generator based on the rotor current command signal. For example, the rotor current command signal may be determined based on the rotor position error and/or the corrected value for the magnetizing reactance, as described above. Further, the rotor current command signal may be input to the rotor current regulator 208, as shown in FIG. 9. As such, the modulator 210 may receive a command signal that accounts for the rotor position error and/or errors in the magnetizing reactance.

Figure 12:
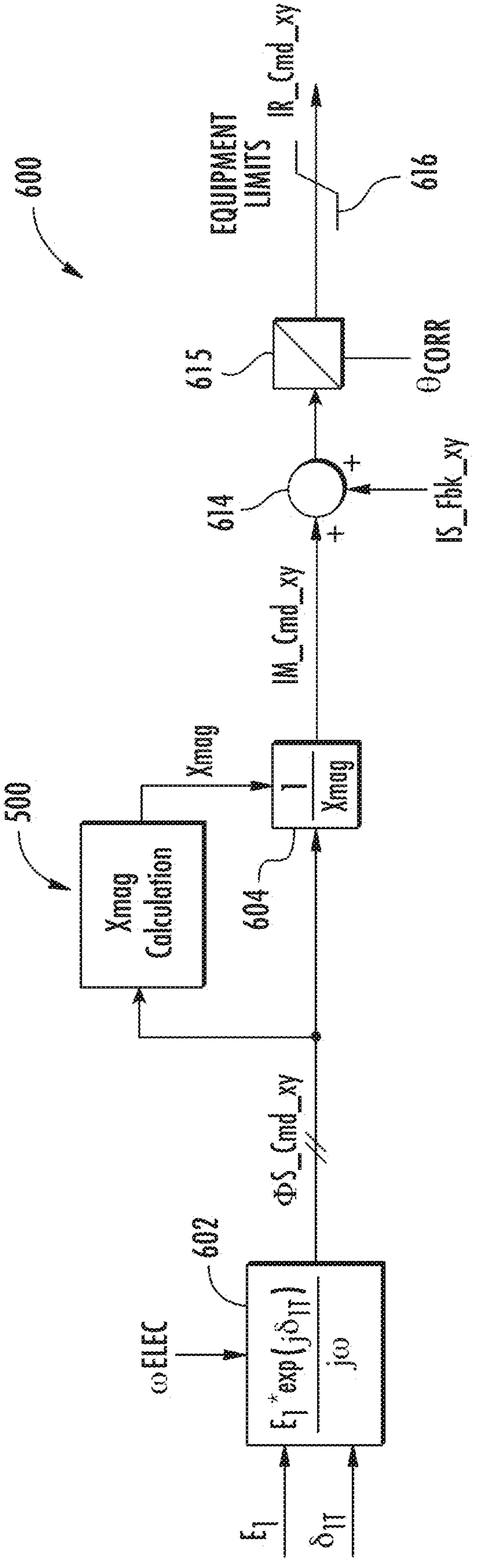
FIG. 12 illustrates a schematic diagram of an embodiment of a grid-forming stator voltage regulator according to the present disclosure.
Figure 13:
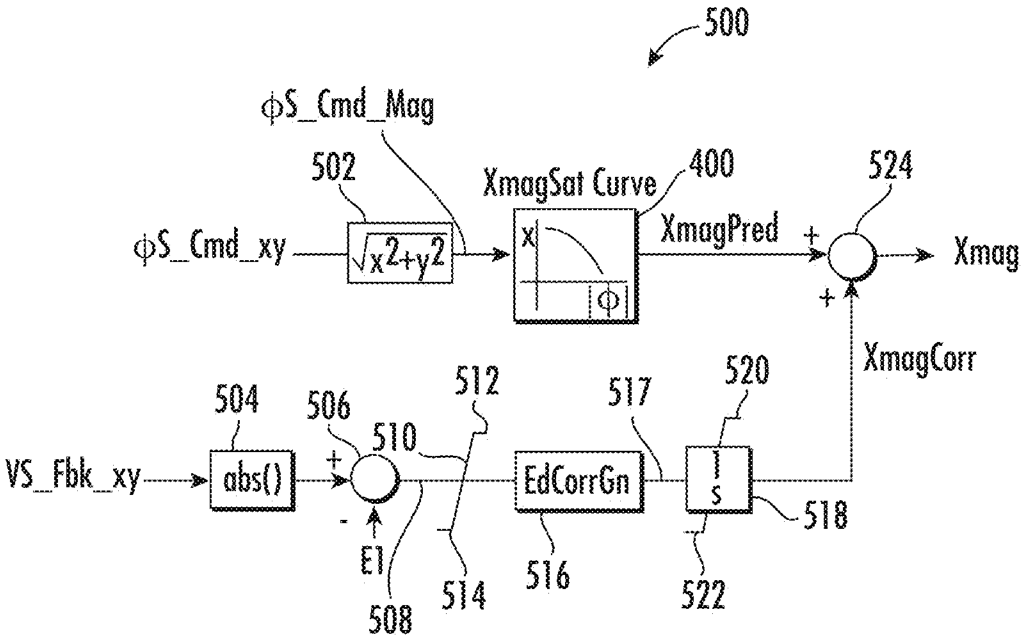
FIG. 13 illustrates a schematic diagram of an embodiment of a magnetizing reactance calculation module according to the present disclosure.

The method 300 of FIG. 10 can be better understood with reference to FIGS. 12-13. In particular, FIG. 12 illustrates a schematic diagram of an embodiment of a grid-forming stator voltage regulator 600 for controlling the DFIG 102 according to the present disclosure. FIG. 13 illustrates a schematic diagram of an embodiment of a magnetizing reactance calculation module 500 for determining the magnetizing reactance of the DFIG 102 according to the present disclosure.

As shown in the embodiment illustrated in FIG. 12, the stator voltage regulator 600 is configured to determine the rotor current command signal (IR_Cmd_xy). More specifically, as shown, the stator voltage regulator 600 is configured to receive a higher level command signal ($E_I$) for magnitude of the stator voltage and a higher level command signal ($\delta_{IT}$) for angle of the stator voltage with respect to the phase-locked loop angle. Further, as shown, the stator voltage command signals ($E_I$, $\delta_{IT}$) are converted to flux commands using a signal indicating electrical frequency $\omega_{elec}$. Moreover, the signals with "_xy" appended to the end represent two-dimensional complex phasors. Thus, as shown, the stator voltage regulator 600 is configured to convert the stator voltage commands ($E_I$, $\delta_{IT}$) to a stator flux command signal (ΦS_Cmd_xy) as shown at 602. Moreover, as shown, the stator voltage regulator 600 may determine or otherwise calculate an expected magnetizing reactance (Xmag) at a desired flux level using the stator flux command signal (ΦS_Cmd_xy). For example, the stator flux command signal (ΦS_Cmd_xy) may be input into a magnetizing reactance calculation module 500 configured to generate an expected magnetizing reactance (Xmag), as described below in regards to FIG. 13. Thus, as shown at 604, the stator voltage regulator 600 may then determine a magnetizing current command signal (e.g., IM_Cmd_xy) as a function of the stator flux command signal (ΦS_Cmd_xy) and a function of the magnetizing reactance Xmag (e.g., 1/Xmag) output from the magnetizing reactance calculation module 500. This implementation assumes that the stator leakage flux is negligible compared to the magnetizing flux.

Accordingly, as shown at 614, the stator voltage regulator 600 may determine the rotor current command signal (IR_Cmd_xy) as a function of the magnetizing current command signal (IM_Cmd_xy) and a stator current feedback signal (IS_Fbk_xy). More specifically, in particular embodiments, as shown, the stator voltage regulator 600 may determine the rotor current command signal (IR_Cmd_xy) by adding the magnetizing current command signal (IM_Cmd_xy) to the measured stator current feedback signal (IS_Fbk_xy). Moreover, in embodiments, as shown at 615, the stator voltage regulator 600 may rotate the rotor current command signal (IR_Cmd_xy) based on the angle correction factor ($\ominus_{CORR}$). In addition, as shown, a limiter 616 may place limits to the rotor current command signal (IR_Cmd_xy) as appropriate to respect equipment rating(s).

As shown in the embodiment illustrated in FIG. 13, the magnetizing reactance calculation module 500 is configured to output the expected magnetizing reactance (Xmag). More specifically, as shown, the magnetizing reactance calculation module 500 is configured to receive the stator voltage command signal ($E_l$), the stator flux command signal (ΦS_Cmd_xy), and a stator voltage feedback signal (VS_Fbk_xy). The magnetizing reactance calculation module 500 can, as shown at 502, determine a magnetized stator flux command signal (ΦS_Cmd_Mag) utilizing Equation (7) below:

$$\Phi s\_Cmd\_mag = sqrt\left(\Phi S\_Cmd\_x^2 + \Phi S\_Cmd\_y^2\right) \qquad \text{Equation (7)}$$

The magnetizing reactance calculation module 500 can then provide the magnetized stator flux command signal (ΦS_Cmd_Mag) to a model (e.g., the saturation curve 400) to determine a predicted value for the magnetizing reactance (XmagPred). For instance, for every Nth linear segment, Xmag is evaluated using Equation (8) below:

$$XmagPredN = SlpN * \Phi s\_Cmd\_Mag + IcptN \qquad \text{Equation (8)}$$

Assuming the slopes (Slp) are descending and the y-intercepts (Icpt) are ascending for any two consecutive linear segments, the final XmagPred, which is used in the calculation of the magnetizing current feed forward signal, is estimated to be the minimum of all N XmagPred calculations, for example, using Equation (9) below:

$$XmagPred = \min(XmagPred1, XmagPred2, \ldots, XmagPredN) \qquad \text{Equation (9)}$$

Further, the magnetizing reactance calculation module 500 can be configured to determine a corrected value for the magnetizing reactance (XmagCorr). For instance, the magnetizing reactance calculation module 500 can, as shown at 504, determine an absolute value of the stator voltage feedback signal (VS_Fbk_xy). The magnetizing reactance calculation module 500 can then compare the absolute value of the stator voltage feedback signal (VS_Fbk_xy) to the stator voltage command signal ($E_l$) (e.g., via a substractor 506) to determine an output 508.

The magnetizing reactance calculation module 500 may be further configured to apply the output 508 to a limiter 510. For instance, the limiter 510 may limit the output 508 by an upper limit 512 and a lower limit 514 to limit the output 508 as appropriate to respect equipment rating(s). The upper limit 512 and the lower limit 514 of the limiter 510 may be fixed variables or dynamic. Further, the magnetizing reactance calculation module 500 may be configured to apply a gain 516 to the limited output 508 to determine a scaled output 517. The gain 516 may be fixed or dynamic. In other embodiments, and the output 508 may be subjected to a deadband before applying the gain 516.

The scaled output 517 is then integrated via integrator 518 to obtain the corrected value for the magnetizing reactance (XmagCorr). The magnetizing reactance calculation module 500 may be further configured to apply one or more constraints on the corrected value for the magnetizing reactance (XmagCorr). For example, the constraint(s) may include an upper limit 520 and a lower limit 522 configured to constrain the corrected value within the normal range of an expected error in magnetizing reactance. The upper limit 520 and the lower limit 522 of the corrected value for the magnetizing reactance (XmagCorr) may be fixed or dynamic variables.

In addition, the magnetizing reactance calculation module 500 may be further configured to determine the expected value for the magnetizing reactance (Xmag) by combining (e.g., via a summator 524) the corrected value for the magnetizing reactance (XmagCorr) and the predicted value for the magnetizing reactance (XmagPred).

Further aspects of the invention are provided by the subject matter of the following clauses:

A method for operating a generator of an inverter-based resource (IBR), the generator having a rotor and a stator, the method comprising: determining, via a controller, a predicted value for a non-linear magnetizing parameter of the generator based at least partially on a stator flux signal; determining, via the controller, a corrected value for the non-linear magnetizing parameter based at least partially on a stator voltage feedback signal; determining, via the controller, an expected value for the non-linear magnetizing parameter based on the predicted value for the non-linear magnetizing parameter and the corrected value for the non-linear magnetizing parameter; determining, via the controller, a rotor current command signal based at least partially on the expected value for the non-linear magnetizing parameter; and controlling, via the controller, the generator based on the rotor current command signal.

The method of any preceding clause, wherein the non-linear magnetizing parameter comprises a magnetizing reactance.

The method of any preceding clause, wherein the stator flux signal comprises a stator flux command signal or a stator flux feedback signal.

The method of any preceding clause, wherein determining, via the controller, the rotor current command signal based at least partially on the expected value for the non-linear magnetizing parameter further comprises: determining, via the controller, a magnetizing current command signal based on the expected value for the non-linear magnetizing parameter; and determining, via the controller, the rotor current command signal based at least partially on the magnetizing current command signal and a stator current feedback signal.

The method of any preceding clause, further comprising determining the rotor current command signal based additionally on an angle correction factor.

The method of any preceding clause, wherein determining, via the controller, the predicted value for the non-linear magnetizing parameter of the generator based at least partially on the stator flux signal further comprises: providing the stator flux signal to a model of the non-linear magnetizing parameter programmed in the controller; and generating, via the model, the predicted value for the non-linear magnetizing parameter.

The method of any preceding clause, wherein the model comprises a saturation curve of the non-linear magnetizing parameter versus an operating parameter.

The method of any preceding clause, wherein the operating parameter comprises at least one of flux and active power.

The method of any preceding clause, wherein determining, via the controller, the corrected value for the non-linear magnetizing parameter based at least partially on the stator voltage feedback signal further comprises: comparing, via the controller, the stator voltage feedback signal to a stator voltage command signal to determine an output; and applying, via the controller, a gain to the output to determine the corrected value for the non-linear magnetizing parameter.

The method of any preceding clause, further comprising applying at least one of a limit and a deadband to the output.

A wind turbine, comprising: a generator having a rotor and a stator; and a controller comprising at least one processor, the at least one processor configured to perform a plurality of operations, the plurality of operations comprising: determining a predicted value for a non-linear magnetizing parameter of the generator based at least partially on a stator flux signal; determining a corrected value for the non-linear magnetizing parameter based at least partially on a stator voltage feedback signal; determining an expected value for the non-linear magnetizing parameter based on the predicted value for the non-linear magnetizing parameter and the corrected value for the non-linear magnetizing parameter; determining a rotor current command signal based at least partially on the expected value for the non-linear magnetizing parameter; and controlling the generator based on the rotor current command signal.

The wind turbine of any preceding clause, wherein the non-linear magnetizing parameter comprises a magnetizing reactance.

The wind turbine of any preceding clause, wherein the stator flux signal comprises a stator flux command signal or a stator flux feedback signal.

The wind turbine of any preceding clause, wherein determining the rotor current command signal based at least partially on the expected value for the non-linear magnetizing parameter further comprises: determining a magnetizing current command signal based on the expected value for the non-linear magnetizing parameter; and determining the rotor current command signal based at least partially on the magnetizing current command signal and a stator current feedback signal.

The wind turbine of any preceding clause, wherein the plurality of operations further comprise determining the rotor current command signal based additionally on an angle correction factor.

The wind turbine of any preceding clause, wherein determining the predicted value for the non-linear magnetizing parameter of the generator based at least partially on the stator flux signal further comprises: providing the stator flux signal to a model of the non-linear magnetizing parameter programmed in the controller; and generating, via the model, the predicted value for the non-linear magnetizing parameter.

The wind turbine of any preceding clause, wherein the model includes a saturation curve of the non-linear magnetizing parameter versus an operating parameter.

The wind turbine of any preceding clause, wherein the operating parameter comprises at least one of flux and active power.

The wind turbine of any preceding clause, wherein determining the corrected value for the non-linear magnetizing parameter based at least partially on the stator voltage feedback signal further comprises: comparing the stator voltage feedback signal to a stator voltage command signal to determine an output; and applying a gain to the output to determine the corrected value for the non-linear magnetizing parameter.

The wind turbine of any preceding clause, wherein the plurality of operations further comprise applying at least one of a limit and a deadband to the output.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a generator of an inverter-based resource (IBR), the generator having a rotor and a stator, the method comprising:

determining, via a controller, a predicted value for a non-linear magnetizing parameter of the generator based at least partially on a stator flux signal;

determining, via the controller, a corrected value for the non-linear magnetizing parameter based at least partially on a stator voltage feedback signal;

determining, via the controller, an expected value for the non-linear magnetizing parameter based on the predicted value for the non-linear magnetizing parameter and the corrected value for the non-linear magnetizing parameter;

determining, via the controller, a rotor current command signal based at least partially on the expected value for the non-linear magnetizing parameter; and controlling, via the controller, the generator based on the rotor current command signal.

2. The method of claim 1, wherein the non-linear magnetizing parameter comprises a magnetizing reactance.

3. The method of claim 1, wherein the stator flux signal comprises a stator flux command signal or a stator flux feedback signal.

4. The method of claim 1, wherein determining, via the controller, the rotor current command signal based at least partially on the expected value for the non-linear magnetizing parameter further comprises:

determining, via the controller, a magnetizing current command signal based on the expected value for the non-linear magnetizing parameter; and determining, via the controller, the rotor current command signal based at least partially on the magnetizing current command signal and a stator current feedback signal.

5. The method of claim 4, further comprising determining the rotor current command signal based additionally on an angle correction factor.

6. The method of claim 1, wherein determining, via the controller, the predicted value for the non-linear magnetizing parameter of the generator based at least partially on the stator flux signal further comprises:

providing the stator flux signal to a model of the non-linear magnetizing parameter programmed in the controller; and generating, via the model, the predicted value for the non-linear magnetizing parameter.

7. The method of claim 6, wherein the model comprises a saturation curve of the non-linear magnetizing parameter versus an operating parameter.

8. The method of claim 7, wherein the operating parameter comprises at least one of flux and active power.

9. The method of claim 1, wherein determining, via the controller, the corrected value for the non-linear magnetizing parameter based at least partially on the stator voltage feedback signal further comprises:

comparing, via the controller, the stator voltage feedback signal to a stator voltage command signal to determine an output; and applying, via the controller, a gain to the output to determine the corrected value for the non-linear magnetizing parameter.

10. The method of claim 9, further comprising applying at least one of a limit and a deadband to the output.

11. A wind turbine, comprising:

a generator having a rotor and a stator; and a controller comprising at least one processor, the at least one processor configured to perform a plurality of operations, the plurality of operations comprising:

determining a predicted value for a non-linear magnetizing parameter of the generator based at least partially on a stator flux signal;

determining a corrected value for the non-linear magnetizing parameter based at least partially on a stator voltage feedback signal;

determining an expected value for the non-linear magnetizing parameter based on the predicted value for the non-linear magnetizing parameter and the corrected value for the non-linear magnetizing parameter;

determining a rotor current command signal based at least partially on the expected value for the non-linear magnetizing parameter; and controlling the generator based on the rotor current command signal.

12. The wind turbine of claim 11, wherein the non-linear magnetizing parameter comprises a magnetizing reactance.

13. The wind turbine of claim 11, wherein the stator flux signal comprises a stator flux command signal or a stator flux feedback signal.

14. The wind turbine of claim 11, wherein determining the rotor current command signal based at least partially on the expected value for the non-linear magnetizing parameter further comprises:

determining a magnetizing current command signal based on the expected value for the non-linear magnetizing parameter; and determining the rotor current command signal based at least partially on the magnetizing current command signal and a stator current feedback signal.

15. The wind turbine of claim 14, wherein the plurality of operations further comprise determining the rotor current command signal based additionally on an angle correction factor.

16. The wind turbine of claim 11, wherein determining the predicted value for the non-linear magnetizing parameter of the generator based at least partially on the stator flux signal further comprises:

providing the stator flux signal to a model of the non-linear magnetizing parameter programmed in the controller; and generating, via the model, the predicted value for the non-linear magnetizing parameter.

17. The wind turbine of claim 16, wherein the model includes a saturation curve of the non-linear magnetizing parameter versus an operating parameter.

18. The wind turbine of claim 17, wherein the operating parameter comprises at least one of flux and active power.

19. The wind turbine of claim 11, wherein determining the corrected value for the non-linear magnetizing parameter based at least partially on the stator voltage feedback signal further comprises:

comparing the stator voltage feedback signal to a stator voltage command signal to determine an output; and applying a gain to the output to determine the corrected value for the non-linear magnetizing parameter.

20. The wind turbine of claim 19, wherein the plurality of operations further comprise applying at least one of a limit and a deadband to the output.

* * * * *